Patented Oct. 14, 1947

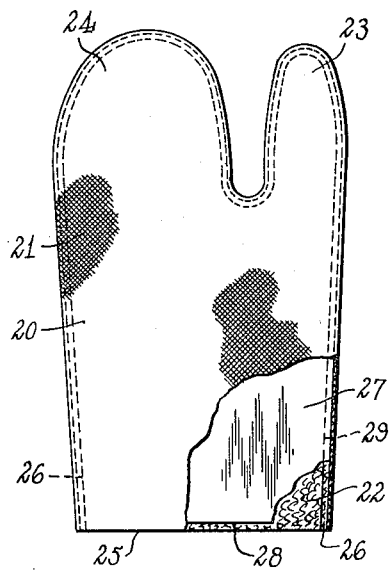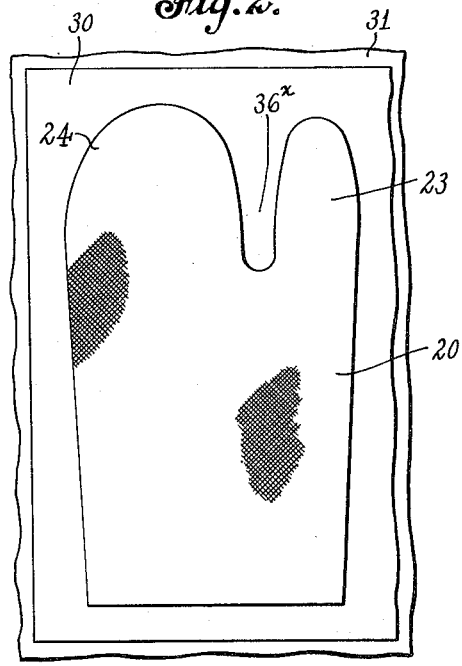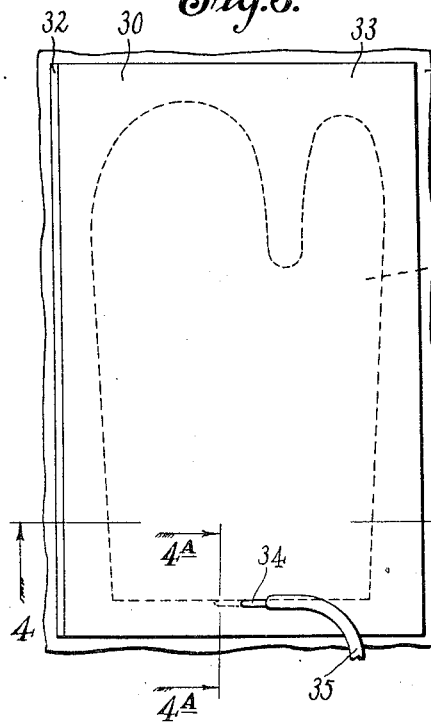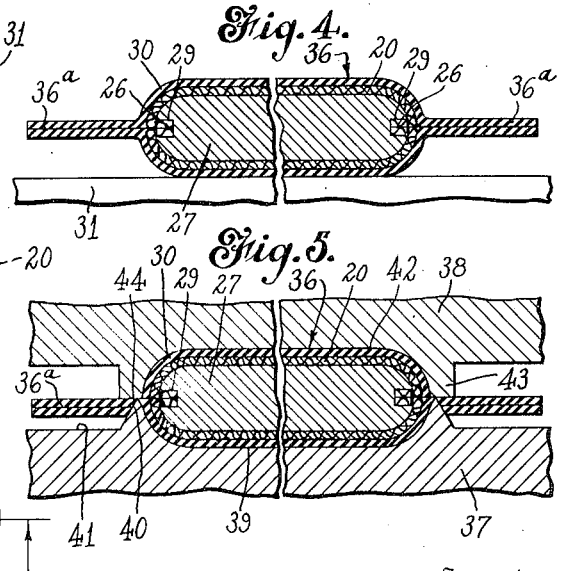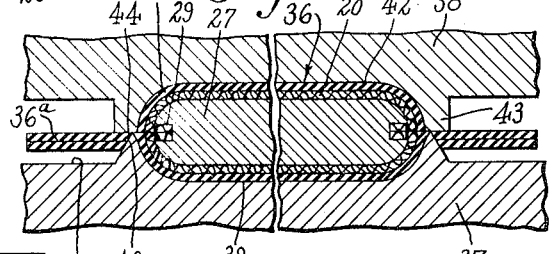
Oct. 14, 1947.     C. J. CROWLEY     2,429,122
METHODS OF MAKING RUBBER GLOVES AND LIKE ARTICLES
Filed Jan. 24, 1944     2 Sheets-Sheet 1
Inventor
Cornelius J. Crowley
By Rockwell & Bartholow
Attorneys

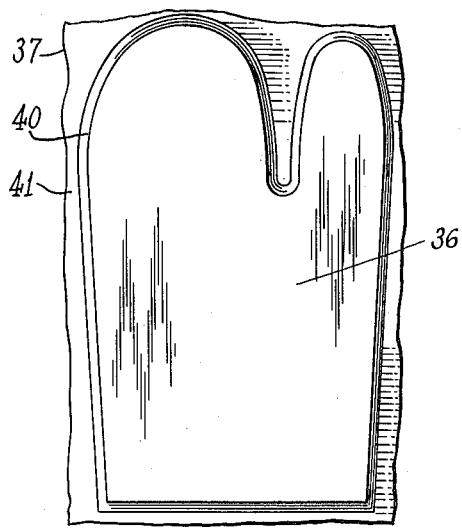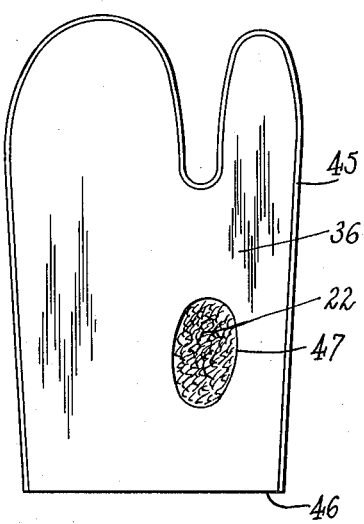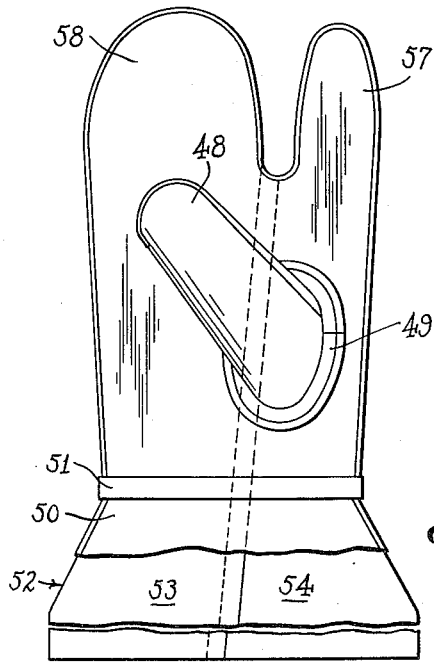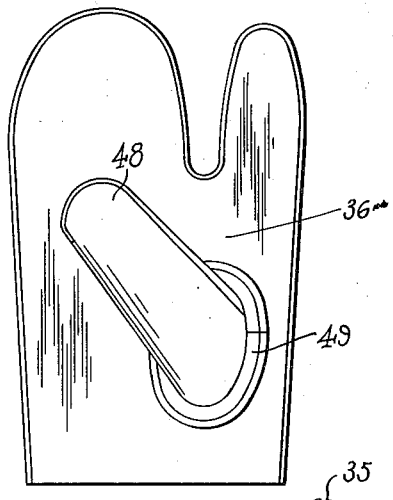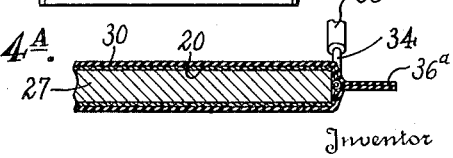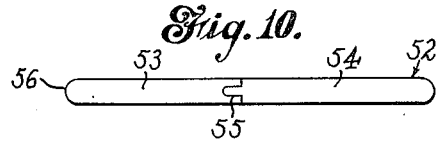

2,429,122

UNITED STATES PATENT OFFICE 2,429,122

METHOD OF MAKING RUBBER GLOVES AND LIKE ARTICLES

Cornelius J. Crowley, New Haven, Conn., assignor to The Seamless Rubber Company, New Haven, Conn., a corporation of Connecticut Application January 24, 1944, Serial No. 519,436

11 Claims. (Cl. 154—110)

This invention relates to a new method of making rubber gloves and like articles.

The term "rubber" is used in a broad sense so as to include rubberlike material as well as natural rubber, it being understood that the plastic material employed is of a character to be formed in an uncured state and thereafter cured or set by the application of heat.

One of the objects of the invention is to provide a process for the manufacture of rubber gloves and like articles, by which the production of the articles is facilitated in comparison to previous processes and the output considerably increased.

Another object is to provide a process which is very simple, and which can be carried out readily by relatively unskilled operators while on the other hand the tools or apparatus used are of a simple, inexpensive character.

To these and other ends, the invention consists in the novel features and steps to be hereinafter described and finally pointed out in the claims.

In the accompanying drawings:

Fig. 1 shows a textile liner applied to a form, the liner and form being partly broken away;

Figs. 2 and 3 show steps in the application of a rubber covering to the liner so that it is conformed to the liner and adhesively connected to it;

Figs. 4 and 4^A are respectively sections on lines 4—4 and 4^A—4^A of Fig. 3;

Fig. 5 is a sectional view illustrating a step in the trimming of the rubber article;

Fig. 6 is a partial plan view, showing the rubber blank lying within the lower cutting die of Fig. 5;

Figs. 7, 8, and 9 are views showing later steps in the process; and

Fig. 10 is an edge view of the form partially shown in Fig. 9.

In the drawings, I have illustrated the new process as being carried out in the production of a heavy rubber glove, in other words a glove of the character of a work glove which is rugged and durable and which has a loose fit upon the hand. In this particular case also, I have shown a glove which is, to an extent, of the mitten type, inasmuch as three of the fingers of the hand are accommodated in a common stall, the other finger, namely the index finger, having its separate stall and the thumb also having a stall. It will be evident, however, that, without change of the principles of the new method of manufacture, gloves of other types may be made.

In general, the new process involves the employment of a pervious liner of soft material which may advantageously be a textile material. This liner has the approximate shape of the glove or like article which is to be made; and to this liner is applied a covering of plastic material which is conformed to the liner by exhaustion of air from the blank by the employment of suction. The uncured plastic envelope, enclosing the liner, is usually constituted by two or more sheets of uncured stock, for example rubber stock suitably compounded or a stock of suitably compounded rubberlike material. The sheets of uncured material are adhesively interconnected at their edges or margins in such a manner as to form a complete enclosure for the liner. The next step is to withdraw the air from the interior of the blank in order that the air in passing inwardly through the interstices of the liner wall may conform the plastic to the liner. After this step, the liner is trimmed in a manner hereinafter described, the blank being opened at the wrist portion, and various finishing steps are carried out, one step being that of curing or vulcanizing the plastic material.

In Fig. 1 there is shown a textile liner 20 which may be constructed of fairly heavy stockinette for example, the liner having a relatively firm and roughened or striated outer surface 21 and a smooth soft inner surface 22. This liner has a stall 23 for the index finger and a stall 24 to receive the second, third, and fourth fingers, and it is open at the wrist as shown at 25. It is preferably made of two pieces of cloth joined together along the margin of the liner by a seam, the seam being disposed at the inner surface so as to project in an inward direction, as indicated at 26.

The liner 20 is placed upon a flat form 27, the same lying in a single plane and corresponding in shape very closely to the inner shape of the liner into which it is adapted to be inserted with a fairly snug fit. The form may advantageously be made of Bakelite or similar thermosetting plastic material and it may advantageously be about one-half inch thick, although I do not limit myself to any particular dimensions. The form has a straight edge 28 at the wrist portion and its length is preferably slightly less than that of the liner, as shown in Fig. 1. The marginal portion of the form is provided in all parts, except for the wrist portion 28, with a continuous groove 29 extending along the sides of the form and along the margin of the stalls 23 and 24, this groove being preferably of rectangular cross section and of a size to receive within it the seam portion 26 of the liner in order that when the liner is applied to the form it may lie closely against the marginal portion of the form (which is curved in cross section, as shown in Fig. 4) without any bump or projection being caused by the provision of the seam.

The form 27 with the liner fitted thereover is next placed upon a sheet 30 of uncured plastic material such as compounded rubber, this sheet being in turn supported upon the top 31 of a work table or the like. In Fig. 2 the sheet 30 is only partially shown, and usually this sheet is of sufficient area to be folded over to create lower and upper plies between which the form is received. Fig. 3 shows the sheet 30 as complete, the same having a lower ply 32 lying against the table and upon the upper surface of which the form is received and there being an upper ply 33 folded over against the upper surface of the textile-covered form. It will be noted from Fig. 3, moreover, that the rubber sheet is of such a size that, when folded in the manner described, it extends laterally beyond the form in all directions. Before the sheet 30 is folded over in the manner shown in Fig. 3, it has a suitable adhesive such as rubber cement (which may if desired contain a certain amount of naphtha or other solvent or softening agent) applied to those surfaces against which the form will be placed as well as the surfaces which extend marginally beyond the form. Thus, when the sheet 30 is in the position shown in Fig. 3, the marginal portions may be manipulated by manually pressing in such a manner as to interconnect adhesively the marginal portions extending all the way around the form. In this manner a plastic envelope is formed which completely encloses the form in a manner to prevent leakage of air at any point in the margin of the blank. The manner in which the marginal portions of the blank are joined together at this stage, to form a fin or flange, is well shown in Figs. 4 and 4A.

The next step is to exhaust the air from the interior of the blank, and for this purpose a hollow suction needle 34 is employed, the same being connected to a rubber tube 35 which is in communication with a suction pump (not shown). The needle 34 is preferably thrust through the blank wall in the location shown in Figs. 3 and 4A, the same piercing one of the uncured rubber walls at a point adjacent the open end of the textile liner. Air is then sucked out of the blank through the rubber tube 35 and this is continued, for say one minute, for the purpose of conforming the uncured rubber wall to the liner and adhesively connecting it to the liner. In this manner, the rubber wall is closely conformed to the margin of the liner along the sides of the liner and along the margins of the finger stalls. In this step the rubber of the sheet portions is drawn forcibly into the space 36x between the finger stalls, and of course if the glove had more finger stalls than in the case illustrated there would be more interdigital spaces into which the rubber would be drawn.

After the completion of the step shown in Figs. 3 and 4, the needle 34 is removed and the small opening through which it is thrust is closed in any suitable manner, as by placing over the opening a small patch (not shown) of uncured rubber material in order that the partial vacuum may be maintained. The blank is left in this condition, that is to say upon the form, for a suitable interval, say several hours, in order that the plastic envelope may closely conform to the liner and set thereon sufficiently to give the desired final shape to the plastic wall.

The suction needle is introduced through the blank wall at a point such that the inner end of the needle is adjacent and adapted to communicate quite directly with the open wrist end of the liner and thus the space inside of the liner which is not occupied by the planar form can be exhausted of air, the air being sucked through the pervious liner in a manner to pull or draw the plastic wall against the latter so that it conforms thereto.

After step illustrated in Figs. 3, 4, and 4A, and after the closing of the small opening through the plastic wall in the manner abovedescribed, the blank, indicated at 36, which then has the projecting marginal portions generally indicated at 36a in Fig. 4, is placed in a suitable die such as indicated at 37 in Figs. 5 and 6, and a cooperating upper die 38 is then moved down into the position shown in Fig. 5 for the purpose of trimming the marginal portion of the blank. The die member 37 may be a fixed member supported on the table (not shown) of a suitable press, and the die member 38 may be the upper movable member of such a press, adapted to be moved downwardly to cooperate with member 37 in trimming the blank by cutting off the laterally projecting fin of rubber. In the form shown, the die member 37 has a cavity 39 receiving approximately the lower half of the blank and conforming to the blank, there being a beveled knife edge 40 immediately adjacent the cavity which receives the body portion of the blank, the knife edge 40 projecting upwardly from the upper face 41 of the die member. To cooperate with the knife edge 40, the upper die member 38 has a marginal abutment surrounding the cavity 42 in the upper die, said abutment being indicated at 43 and having a planar lower face 44 with which the knife edge is adapted to cooperate. In Fig. 5, the upper and lower die members are shown as closed upon the blank, the upper member being in the position in which it is brought against the knife edge to complete the severing of the fin or flange extending around the blank, and it will be noted that the line of severance is so located that the fin or flange is substantially completely removed so as to leave the blank with a curved side wall substantially devoid of any lateral projection.

It will be understood that the knife edge 40 and its cooperating part 43 extend completely around the margin of the blank and that, in trimming the blank, the latter will be trimmed along its wrist end in a straight line. As the liner is open at this end, the effect of using the severing effect of the knife in close proximity to the end face 28 of the form (which is the action that takes place) is to cut through the projecting layers of rubber and, in some cases, one or more layers of textile material adjacent the lower end of the form (Fig. 3) and thereby open the blank at the wrist end at the same time that it is cut or trimmed across the wrist end.

After the blank has been trimmed in the manner just described, it is lifted out of the lower trimming die. A finishing strip 45 of suitable plastic material may then be applied adhesively to the margin of the blank in the location shown in Fig. 7, this strip extending along the sides of the glove and along the margins of the finger stalls. The form 27 may then be pulled out of the blank through the open end of the latter, this open end being indicated at 46 in Fig. 7. Thereafter, a hole 47 is cut through one of the side walls of the blank, depending upon whether the glove is to be a right-hand glove or a left-hand glove, the opening in question being used in connection with a thumb stall 48 such as shown in Fig. 8. In the case shown, the glove to be constructed is a right-hand glove and the opening 47 is located to receive the thumb of the right hand. After the opening 47 has been cut in the blank, the thumb stall 48 is applied to the blank over the opening and secured to the blank body in a suitable manner. The thumb stall 48 will have an outer layer of sheet rubber, said layer being formed up and finished in a suitable manner and being provided with an adhesively applied textile lining similar to the previously described lining on the glove body. In the case illustrated, the thumb stall is adhesively connected to the body by the use of a suitable cement, a connecting strip 49 of rubber or other suitable plastic material being applied around the proximal end of the stall so as to adhere to the body and to the stall.

The glove may or may not have a gauntlet. In the case illustrated, the glove has a gauntlet of which a portion is illustrated at 50 in Fig. 9, there being a finishing strip 51 of rubber or other suitable plastic material applied around the glove body at its lower margin where it joins the gauntlet. After application of the gauntlet, if the glove is of that type, a planar form such as shown at 52 in Fig. 9 is introduced into the glove. This form 52 can advantageously be made of wood or like material, and in order to expedite its insertion into the glove it may advantageously be made in two sections 53, 54, these sections having between their meeting edges (arranged longitudinally of the form) a tongue-and-groove joint 55 which assists in holding one section in place relatively to the other. It will be understood that the form 52 is simply a flat member of some thickness, having rounded side edges 56 and adapted to conform to and support the glove at the interior. It is also understood, of course, that the section 54 of the form has a part entering and conforming to the smaller finger stall 57 of the glove, while section 53 has a portion entering the finger stall 58. The thumb stall 48 is so constructed and applied to the glove body that it normally extends over the palm side of the glove body obliquely, lying in close proximity to the glove body and in a plane substantially parallel to its plane.

In vulcanizing the glove or setting it by heat, the preferred practice is to suspend the form 52 from the wrist end in a suitable rack or the like while the glove is subjected to the action of heated air. While this is advantageous, the thermosetting or vulcanizing step can, however, be carried out in other ways. In some cases it will not be necessary to support the article upon a form at this stage, but the use of a sectional planar form is preferred.

By the new process herein described, the manufacture of rubber gloves and other articles having one or more projecting finger portions is speeded up to a notable degree and the output of the factory can be increased to a considerable extent. The procedure is relatively simple and it can be carried out readily by relatively unskilled operators. The rubber or other plastic material is very strongly bonded to the textile liner, and the glove can be readily provided with an external surface which is neat and devoid of unsightly projections. The bonding of the rubber with the cloth or the like can also be effected very quickly and, in fact, the entire operation of manufacturing the glove occupies a relatively short period.

As above indicated, the process can be used in the manufacture of gloves differing in various respects from the one herein particularly described by way of an example.

Various changes in the procedure can be adopted without departing from the principles of the invention or the scope of the claims.

What I claim is:

1. The method of making a hollow rubber article, which comprises providing a hollow textile liner, introducing into the liner a relatively rigid form, applying over the form sheets of uncured rubber and interconnecting said sheets to enclose the liner in an airtight manner, exhausting the air from the interior of the blank so as to conform the uncured rubber to the liner, and then curing.

2. The method of making a hollow rubber article which has a projecting finger portion and which is open at one end, said method comprising providing a hollow textile liner having a projecting finger portion and open at one end, introducing into the liner through its open end for supporting the same a substantially planar form, applying over the form a layer of uncured rubber so as to enclose the liner and form in an airtight manner, exhausting the air from the interior of the blank so as to conform the uncured rubber to the liner, and then curing.

3. The method of making a rubber article, which comprises providing a pervious hollow liner having projecting finger portions and open at one end, introducing through the open end of said liner a supporting form, applying over the form-supported liner a covering layer of uncured rubber which encloses the liner in an airtight manner, exhausting the air from the interior of the blank so as to draw the uncured rubber into the space between the finger portions, opening up the blank adjacent the open end of the liner, and curing.

4. The method of making a plastic-covered article, which comprises providing a hollow pervious liner having projecting finger portions and open at one end, introducing through the open end of the liner a form which supports the finger portions thereof, applying over the liner a covering layer of uncured plastic material made up of interconnected sheets which encloses the liner in an airtight manner, exhausting the air from the interior of the blank to conform the plastic material to the liner between the finger portions of the latter, opening up the blank adjacent the open end of the liner, and curing.

5. The method of making a plastic-covered article, which comprises providing a pervious hollow liner having projecting finger portions and an open end, introducing through the open end of the liner a form which supports the finger portions of the liner, applying over the liner a covering layer which encloses the liner in an airtight manner and which comprises sheets interconnected adjacent the margin of the liner and projecting laterally from the liner, exhausting the air from the interior of the blank to conform the plastic material to the liner, and trimming the blank and opening it up adjacent the open end of the liner by subjecting the blank to the action of a cutting die.

6. The method of making a rubber glove, which comprises providing a textile hollow liner having projecting finger portions and open at the wrist end, applying over the liner a rubber layer of uncured sheet rubber which encloses the liner in an airtight manner, exhausting the air from the interior of the blank to conform the rubber to the liner, opening up the blank adjacent the wrist end of the liner, applying a thumb stall to the body of the blank, and curing.

7. The method of making a rubber article, which comprises providing a textile hollow liner having projecting finger portions and open at one end, said liner comprising sheets interconnected at the margin of the liner by a seam disposed adjacent the inner surface of the liner, inserting into the liner through the open end a form having a marginal groove which receives said seam, applying over the liner and form a rubber layer of uncured sheet rubber which encloses the liner in an airtight manner, exhausting the air from the interior of the blank to conform the rubber to the liner, opening up the blank adjacent the open end of the liner, and curing.

8. The method of making a rubber article, which comprises providing a pervious hollow liner having projecting finger portions and open at one end, applying over the article a layer of uncured sheet rubber which encloses the liner in an airtight manner, exhausting the air from the interior of the blank to conform the rubber to the article, trimming the blank at its marginal portion by a cutting operation which concurrently opens the blank adjacent the open end of the liner, and curing.

9. The method of making a hollow rubber article which comprises providing a hollow textile liner open at one end, inserting into the liner by way of its open end a relatively rigid form, applying over the liner and form sheets of uncured rubber and interconnecting said sheets to enclose the liner and form in an airtight manner, and exhausting the air from the space within the liner through an opening formed through the rubber wall in order to conform the rubber to the liner.

10. The method of making articles of rubber which comprises providing a rigid form, applying over the form in generally enclosing relation sheets of uncured rubber, interconnecting said sheets adhesively to create a rubber blank wholly enclosing the form, sucking the air out of the blank to thereby draw the rubber wall in the direction of the outer surface of the form for shaping it, and then opening up the blank and stripping it off of the form.

11. The method of making articles of rubber which comprises providing a rigid form, applying over the form in generally enclosing relation sheets of uncured rubber with a flexible pervious liner intervening, interconnecting said sheets adhesively to create a blank wholly enclosing the form, sucking the air out of the blank to thereby draw the rubber wall against the liner supported by the form and thereby shape the rubber wall, and then opening up the blank and stripping it off of the form.

CORNELIUS J. CROWLEY.

REFERENCES CITED

The following references are of record in the file of this patent:

UNITED STATES PATENTS

| Number | Name | Date |
| --- | --- | --- |
| 2,354,916 | Hurt | Aug. 1, 1944 |
| 1,387,728 | Kramer | Aug. 16, 1921 |
| 1,931,324 | Newton | Oct. 17, 1933 |
| 1,939,852 | Howard et al. | Dec. 19, 1933 |
| 1,538,262 | Ackerman | May 19, 1925 |
| 1,469,029 | Underwood et al. | Sept. 25, 1923 |
| 1,146,638 | Miller | July 13, 1915 |
| 2,012,927 | Hansen | Aug. 27, 1935 |
| 2,032,832 | Blair et al. | Mar. 3, 1936 |
| 2,276,004 | Vidal et al. | Mar. 10, 1942 |
| 2,233,174 | McDonald | Feb. 25, 1941 |
| 2,007,548 | Sampson | July 9, 1935 |
| 1,592,536 | O'Neil | July 13, 1926 |